No. 44,368. PATENTED SEPT. 20, 1864.
N. A. GARDINER, Jr.
FISH HOOK.
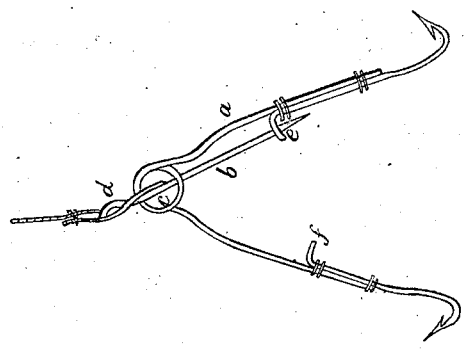
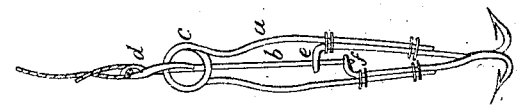
Witnesses.
George B. McMinn.
Ishmael E. Gardiner.
Inventor.
Nathaniel Gardiner, Jr.

UNITED STATES PATENT OFFICE.

NATHAN A. GARDINER, JR., OF WILLETT, ASSIGNOR TO HIMSELF AND JOSEPH BRIGGS, OF NEW YORK, N. Y.

IMPROVEMENT IN FISH-HOOKS.

Specification forming part of Letters Patent No. 44,368, dated September 20, 1864.

*To all whom it may concern:*

Be it known that I, NATHAN A. GARDINER, Jr., of Willett, Cortland county, New York, have invented a new and Improved Fish-Hook; and I do hereby declare the following to be a full, clear, and exact description thereof, reference being had to the accompanying drawings, and figures and letters of reference thereon, making part of this specification.

In the drawings, Figure 1 shows my improved fish-hook as set ready for fishing, and Fig. 2 shows it as open.

My invention consists in so constructing a hook that it shall strike and securely hold the fish firmly at the instant of biting.

To enable others skilled in the art to make and use my invention, I will describe the construction and operation thereof.

I take steel wire of proper size and coil it one or more times round a mandrel for the spring $c$, having the forks $a$ of sufficient length to attach the hooks. I then take a piece of wire, $b$, and make a loop or ring, $d$, to which the line is attached, and which shall inclose the spring $c$ at its upper end, (having sufficient play,) while the lower end passes through the eye $e$, which forms part of the hook which is attached to the fork $a$. Upon the opposite fork is secured another hook, having an eye, $f$, which is below the eye $e$.

The operation will be as follows: The angler places the bait upon either or both hooks and then presses them together until the spindle $b$, guided by the eye $e$, will pass into the eye $f$ on the opposite fork $a$ and lock the hook. The fish takes the hook into its mouth and gives a slight pall, which withdraws the spindle $b$ from the eye $f$, and the spring drives the hook into the mouth of the fish, holding it firmly, and at the same time forcing open the mouth.

It will be obvious to any one that the spring, with its eyes and hooks, may be made from a single piece of wire, and I design to have them so made.

I claim—

The combination of a pair of bearded hooks attached to or forming part of a coil-wire spring, $c$, and provided with eyes $e$ and $f$, and a rod, $b$, having a line-eye, $d$, for setting and releasing the hooks, whereby I am enabled to make a cheap, simple, and effectual spring-hook, the whole constructed and operating substantially as described and set forth.

NATHAN A. GARDINER, JR.

Witnesses:
GEO. T. MCMINN,
ISHMAEL E. GARDINER.